US007533265B2

(12) United States Patent
Ballinger et al.

(10) Patent No.: US 7,533,265 B2
(45) Date of Patent: May 12, 2009

(54) ESTABLISHMENT OF SECURITY CONTEXT

(75) Inventors: Keith W. Ballinger, North Bend, WA (US); HongMei Ge, Issaquah, WA (US); Hervey O. Wilson, Bellevue, WA (US); Vick B. Mukherjee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 826 days.

(21) Appl. No.: 10/892,046

(22) Filed: Jul. 14, 2004

(65) Prior Publication Data
US 2006/0015728 A1  Jan. 19, 2006

(51) Int. Cl.
*G06F 21/00* (2006.01)

(52) U.S. Cl. .......................................... 713/172; 726/1

(58) Field of Classification Search .................. 713/172
See application file for complete search history.

(56) References Cited

U.S. PATENT DOCUMENTS

| | | | | |
|---|---|---|---|---|
| 5,944,824 | A * | 8/1999 | He | 726/6 |
| 6,044,155 | A | 3/2000 | Thomlinson et al. | 713/155 |
| 6,272,631 | B1 | 8/2001 | Thomlinson et al. | 713/155 |
| 6,532,542 | B1 | 3/2003 | Thomlinson et al. | 713/187 |
| 6,604,198 | B1 | 8/2003 | Beckman et al. | 713/167 |
| 2002/0031230 | A1* | 3/2002 | Sweet et al. | 380/278 |
| 2002/0072922 | A1* | 6/2002 | Suzuki et al. | 705/1 |
| 2003/0014625 | A1* | 1/2003 | Freed et al. | 713/153 |
| 2003/0061365 | A1 | 3/2003 | White et al. | 709/229 |
| 2003/0212540 | A1 | 11/2003 | Meredith et al. | 704/4 |
| 2003/0212671 | A1 | 11/2003 | Meredith et al. | 707/3 |
| 2003/0212672 | A1 | 11/2003 | Meredith et al. | 707/3 |
| 2004/0034770 | A1 | 2/2004 | Kaler et al. | 713/155 |
| 2004/0060002 | A1 | 3/2004 | Lucovsky et al. | 715/513 |
| 2004/0093515 | A1 | 5/2004 | Reeves | 713/201 |

OTHER PUBLICATIONS

Hanson, J., et al., "Conversation Support for Business Process Intergration," Proceedings Sixth International Enterprise Distributed Object Computing Conference, Sep. 2002, pp. 65-74.

Yocum, K., et al., "Any Point Communication Protocol," Proceedings Eighth Workshop on Hot Topics in Operating Systems, May 2001, p. 189.

Mitchell, B., "Indigo, Web Services and Extreme Programming," "Benjaminm's Blog", May 21-Jun. 2, 2004, available at http://benjaminm.net/default.aspx?date=2004-06-02.

(Continued)

*Primary Examiner*—Gilberto Barron, Jr.
*Assistant Examiner*—Cordelia Kane
(74) *Attorney, Agent, or Firm*—Workman Nydegger

(57) ABSTRACT

The present invention provides for maintaining security context during a communication session between applications, without having to have executable code in either application for obtaining or generating a security context token (SCT) used to secure the communication. On a service side, a configuration file is provided that can be configured to indicate that automatic issuance of a SCT is enabled, thereby allowing a Web service engine to generate the SCT upon request. On the client side, when a message is sent from the client application to the service application, a policy engine accesses a policy that includes assertions indicating that a SCT is required for messages destined for the Web service application. As such, the policy engine requests and receives the SCT, which it uses to secure the message.

36 Claims, 3 Drawing Sheets

OTHER PUBLICATIONS

Mitchell, B., "Indigo, Web Services and Extreme Programming," Benjaminm's Blog, Jun. 7-Jun. 30, 2004, *available at* http://benjaminm.net/default.aspx?date=2004-06-30.

Maine, S., "Brain.Save( )," Mar. 2-Mar. 17, 2004, *available at* http://hyperthink.net/blog/default,date,2004-03-17.aspx.

Wilson, H., "Security Context Token," Herveyw's Blog: Inside WSE, Jan. 21, 2004, *available at* http://www.dynamic-cast.com/mt-archives/000038.html.

Wilson, H., "Automatic Secure Conversation," Herveyw's Blag:WS-Secure Conversation Archives, Apr. 8, 2004, *available at* http://dynamic-cast.com/mt-archives/cat_wssecureconversation.html.

Atkinson, B., et al., "Web Services Security (WS-Security)," MSDN Library, Version 1.0, Apr. 5, 2002, *available at* http://msdn.microsoft.com/library/en-us/dnglobspec/html/ws-security.asp?frame=true.

Anderson, S., et al., "Web Services Trust Language (WS-Trust)," MSDN Library, Version 1.1, May 2004, *available at* http://msdn.microsoft.com/library/en-us/dnglobspec/html/ws-trust.asp?frame=true.

Anderson, S., et al., "Web Services Secure Conversation Language (WS-SecureConversation)," MSDN Library, Version 1.1, May 2004, *available at* http://msdn.microsoft.com/library/en-us/dnglobspec/html/ws-secureconversation.asp?frame=true.

Box, D., et al., "Web Services Policy Framework (WS-Policy)," Cover Pages, Version 1.1, May 28, 2003, *available at* http://xml.coverpages.org/ws-policyV11.pdf.

Box, D., et al., "Web Services Policy Attachment (WS-Policy Attachment)," Cover Pages, Version 1.1, May 28, 2004, *available at* http://xml.coverpages.org/ws-policyattachmentV11.pdf.

Box, D., et al., "Web Services Policy Assertions Language (WS-Policy Assertions)," MSDN Library, Version 1.1, May 28, 2003, *available at* http://xml.coverpages.org/ws-policyassertionsV11.pdf.

Powell, M., "Programming with Web Services Enhancements 2.0," MSDN Library, May 2004, *available at* http://msdn.microsoft.com/library/en-us/dnwse/html/programwse2.asp?frame=true.

\* cited by examiner

ESTABLISHMENT OF SECURITY CONTEXT

CROSS-REFERENCE TO RELATED APPLICATIONS

N/A

BACKGROUND OF THE INVENTION

1. The Field of the Invention

The present invention generally relates to computer network security. More specifically, the present invention provides for maintaining a secure context between two applications, without having to have executable code in either application for obtaining or generating security context tokens used to secure the communication.

2. Background and Related Art

Computer systems and related technology affect many aspects of society. Indeed, the computer systems ability to process information has transformed the way we live and work. Computer systems now commonly perform a host of tasks (e.g., word processing, scheduling, database management, etc.) that prior to the advent of the computer system were performed manually. More recently, computer systems have been coupled to one another to form computer networks over which the computer systems can communicate electronically to share data. Web services has been a driving force in advancing such communications between systems and allows applications to share data, and—more powerfully—invoke capabilities from other applications without regard to how those applications were built, what operating system or platform they run on, and what devices are used to access them. Although Web services remain independent of each other, they can loosely link themselves into a collaborating group that forms a particular task. Web services are invoked over the internet by means of industry-standard protocols including SOAP (Simple Open Access Protocol), extensible Markup Language (XML), and Universal Description, Discovery and Integration (UDDI), Web Service Description Language (WSDL), etc.

Often, electronic communication on a computer network includes a client computer system (hereafter referred to as a "client") requesting access to a network service (e.g., Web services) at a server computer system (hereinafter referred to as a "service"). Frequently, network services are protected by security mechanisms such that only trusted clients are allowed to access the network services. Thus, when requesting access to a network service, a client may be required to submit security input that includes or represents security assertions (e.g., a user I.D., a password, a digital signature, digital certificates, etc.). The service can process the submitted security input and output a security response. When the client security input is appropriate (e.g., when the client is authenticated and authorized), the service may output a security response that indicates access to the network service has been granted. On the other hand, when the client's security input is not appropriate, the service may output a security response that indicates access to the network service has been denied.

Although the use of authentication mechanisms such as digital signatures and digital certificates are generally useful for one-way messages, they are subject to several forms of attacks, e.g., recording a signed message and resending it (a reply attack). For these reasons, parties involved in a multi-message exchange typically establish a mutually authenticated security context, which refers to an established authentication state and negotiated key(s) that may have additional security-related properties. Rather than exclusively using public/private keys, this approach involves the use of a session key that is used by the parties to encrypt data that is shared between them.

Under this approach, parties exchange credentials (i.e., authenticate either mutually or unilaterally, e.g., just the client) only once, at the beginning of the conversation. If the credentials are accepted, the requester gets a security context token that acts as a lightweight credential. Subsequent messages in the conversation only have to carry this security context token, because the token implies the security context established by the initial exchange of credentials. This makes processing a secure conversation faster than processing each message individually.

Typically, a security context may be established by a client requesting the security context token from a token issuer. This request for the token will typically include the client's base token (e.g., a user name, identity, key, computing capabilities, etc.), or at least a reference thereto. Upon authentication, the issuer then issues the security context token to the client for it to use with the service. In particular, the security context token will be used to sign and/or encrypt messages, and reference the base token information, which will typically include a shared secret such as symmetrical key used for encryption and signing. Both the client and the service will use the security context token for all subsequent communication messages exchanged between them.

Although the security context token allows for faster processing, while still maintaining signing, encryption and authentication of messages, there are several drawbacks to the current security context infrastructure. For example, both the client and the service must have a significant amount of code within each application in order to utilize and maintain the security context token. For instance, the client needs to have code written in its application that will recognize that communications with the service application must use a security context token, request such token from a token issuer, provide the appropriate information within the request, save the security context token for future communications, and reference the appropriate base token and shared secret when receiving communications from the service using the security context token. Likewise, the service application must be coded such that when receiving secured messages from the client based on the security context token, the service application must be able to identify the base token, determine the appropriate session key associated with the base token to decrypt the message, save the security context token, and reuse the security context token to encrypt messages and sign them for securely delivering them to the client.

Because such implementations for security context must be coded in both the client and service applications, there is little, if any flexibility, nor ease in extending the system. For example, if it may be desirable to extend the Web services to enable it to issue security context token; however, doing such would require another large amount of code in the service application and as well as rewriting existing code. Further, because such application developers are typically not experts in such security context issues, there are security concerns that come into play, as well as performance, stress, or other robustness factors.

BRIEF SUMMARY OF THE INVENTION

The above-identified deficiencies and drawbacks of current security context systems are overcome by the present invention. For example, in a distributed system configured to exchange messages between computing systems, wherein mutual authentication between two applications on different computing systems has been established, the present invention provides for maintaining a secure conversation between two applications using a security context token, without having to have executable code in either application for obtaining the security context token.

Example embodiments provide for receiving a message from a client application, wherein the message is to be sent to a service application in a communication session as a part of an established security context. A policy corresponding to the client application is accessed. The policy including a declarative policy assertion for determining that communication session messages sent to the service application should be communicated using a security context token associated with the base token used in establishing the security context. Based on information within the policy, the security context token is requested, the request including information for identifying the base token. In response to the request, the security context token is received and can be used for securing the message prior to sending it to the service application.

Other example embodiments provide for maintaining a security context between two applications using a security context token, without having to have executable code on either application for generating the security context token. A request for a security context token is receive, which includes an identifier that references a base token used in establishing a security context for a communication session between a client application and a service application. Based on information within the request, a configuration file corresponding to the service application may be accessed for determining that an automatic issuance property for a security token is enabled. The request for the security context token may be passed to an instance of a class that uses the identifier within the request for generating the security context token. An identifier associated with the security context token is stored that references the base token. The security context token is then sent to the client application for using and applying to messages of the communication session.

Additional features and advantages of the invention will be set forth in the description which follows, and in part will be obvious from the description, or may be learned by the practice of the invention. The features and advantages of the invention may be realized and obtained by means of the instruments and combinations, particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems and computer program products for maintaining a secure conversation between two applications using a security context token. The embodiments of the present invention may comprise a special purpose or general-purpose computer including various computer hardware, as discussed in greater detail below.

A security context is an abstract concept that refers to an established authentication state and negotiated key(s) that may have additional security-related properties. When multiple messages between a client and a service are anticipated, both systems can authenticate (i.e., either mutually or unilaterally) and use a security context token, which is a wire representation of the security context concept. Authentication may be done through, e.g., a trusted third party, wherein the client can provide the third party with information such as a user name, password, identity, key(s), system capabilities, etc.

Upon verification of the supplied information, a base token can be issued and sent to a service application for proof of authentication. The base token may include similar information as the information originally supplied for requesting authentication, e.g., username, key(s), etc. The service can also be verified through a similar process. Of course, as one would recognize, other forms of authentication may be available. For example, the client and the service applications may negotiate their own authentication. Accordingly, the above example of authentication is used for illustrative purposes only.

Regardless of how authentication is established, as previously described, a security context token (SCT) may expedite the communication between the client and the service in multiple-message communication sessions. The SCT may be used to secure messages by, e.g., signing, encryption, authentication, etc. The security context token can be used to reference the base token, i.e., the information used to establish the original authentication with the shared secret or keys, which may be derived keys, or any other well-known method for signing and encrypting. For example, a reference to the base token may be stored locally as a relationship between the security context token and the base token through an implicit binding. Alternatively, the correlation between the security context token and base token may be explicitly referenced in the security context token.

Figure 1:
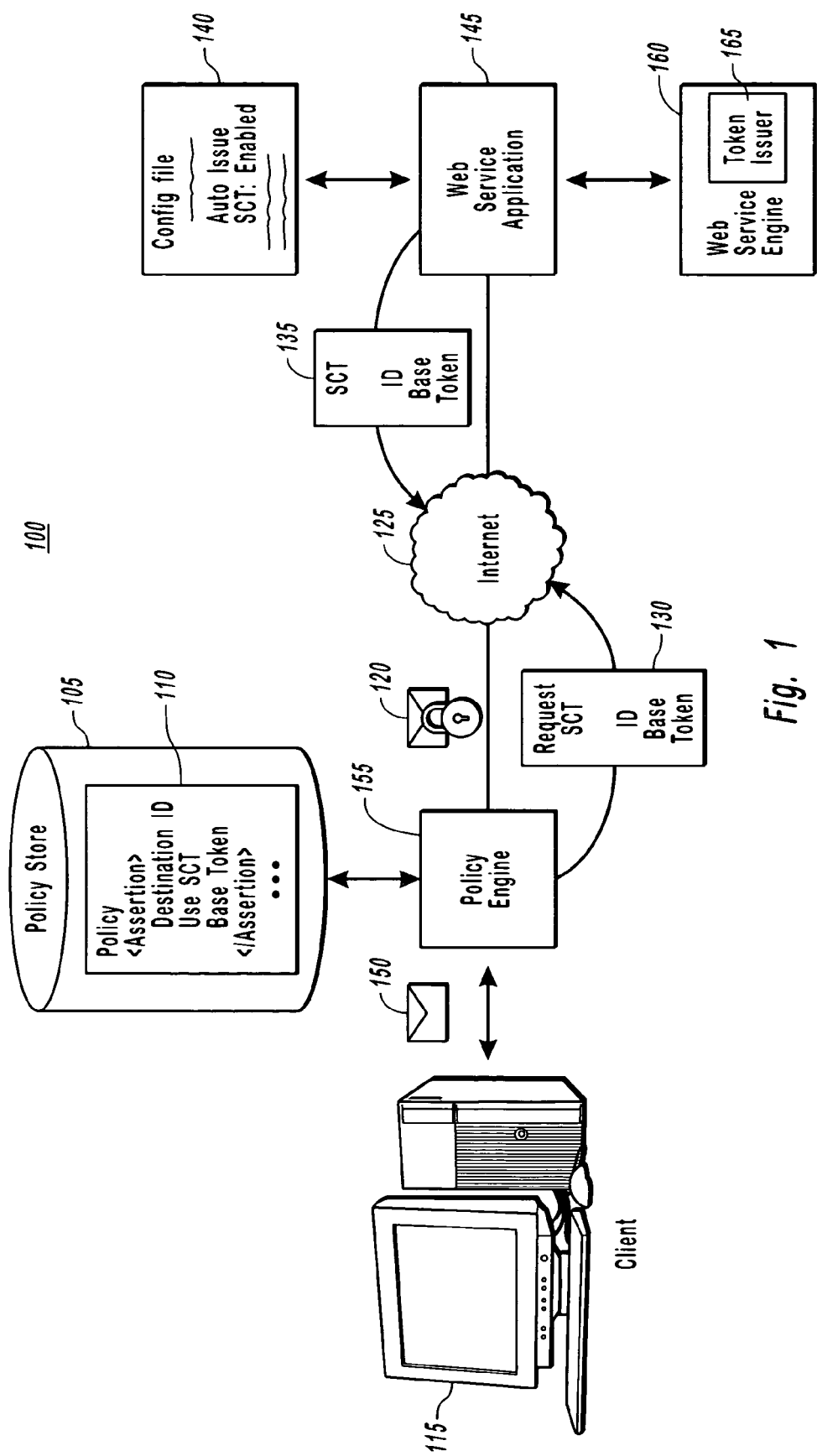
FIG. 1 illustrates a distributed system capable of maintaining a secured context in accordance with example embodiments of the present invention.

Example embodiments provide for maintaining security context between applications using security context tokens, without the applications in the communication session having to have executable code for obtaining or generating the security context token. FIG. 1 illustrates a distributed system 100 configured for achieving this desired embodiment. From a client 115 side, when a message 150 is desired to be sent after mutual authentication in a communication session, example embodiments provide for a policy engine 155 which intercepts the message 150 and can access it for obtaining information for enforcing policies associated therewith.

Example embodiments provide for a policy document, which includes one or more policy expressions. A policy expression is a declarative model (e.g., an XML (eXtensible Markup Language) Infoset) of one or more policy assertions, capable of being read by several machines in a heterogeneous system. Policy assertions represent individual preferences, requirements, capabilities, or other general characteristics. For example, a policy expression may be of a generic form for specifying such things as a character encoding, natural language, version of a particular specification, etc. Moreover, as described in greater detail below, example embodiments allow a developer to specify their own custom policy assertions within the policy document, e.g., all messages need to have a customer identification, etc. In addition to these generic and custom message assertions, example embodiments provide for a set of security-related policy assertions. Such policies may provide for one or more of security token propagation, message integrity, message confidentiality, visibility (i.e., those portions of a message that should be able to be processed by an intermediary or endpoint), message age (i.e., the acceptable time period before messages are discarded), etc., through one or more of a signature, encryption, token, username/password credentials, etc.

Referring again to FIG. 1, policy engine 155 may receive a message 150 from client 115, where upon a destination I.D. for Web service application 145 is referenced, as well as other information, e.g., an action identifier associated with the message indicating the type of message (such as, request, reply, failure, etc). The policy engine 155 may then access a policy 110 within policy store 105, and (based on the information associated with the message 150) identify and implement the appropriate assertions within the policy 110. Of course, the policy assertions and expressions applied may be default policies or explicitly referenced to the endpoint destination. Accordingly, the implementation of enforcing (and verifying—depending on whether messages are being sent or received, respectively) policy assertions to messages 150 are used for illustrative purposes only and are not meant to limit or otherwise narrow the scope of the present invention.

One example embodiment provides for a policy assertion, shown in policy 110, configured to specify that security context tokens should be used when communicating with the Web service application 145 by referencing its destination I.D. As one would appreciate, the destination I.D. within the assertion may be any one of a Uniform Resource Identifier (URI) or any other unique identifier for referencing the location of the Web service application 145. Policy 110, e.g., the declarative assertion requiring SCT for messages 150 sent to Web service application 145, should also associate the base token with the SCT. Based on a portion of the information associated with policy assertion, policy engine 155 will make a request 130 for the SCT, which includes an identifier of the base token, the base token itself, or any other supporting tokens. Prior to sending the request, however, other embodiments provide for changing the properties of the request 130 to conform to additional policies as described in the policy 110. For example, the request 130 message may need to be signed and encrypted by the policy engine 155.

Example embodiments allow for the token issuer to be identified explicitly within policy 110. For instance, the declarative policy assertion within policy 110 may specify a specific URI or other identifier that indicates where the request for the SCT should be made. Otherwise, if no explicit token issuer is identified, example embodiments provide a default of querying the Web service application 145 for the SCT. By using absence of a token issuer identifier as a way to determine the location, the policy is easier to manage and deploy.

Assuming the Web service application 145 is referenced as being able to issue the security context token 135 (or assuming no reference is made and the default is to query the Web service application 145) the request for the SCT 130 is sent via, e.g., the internet 125 to Web service application 145. Example embodiments provide that if the Web service application's 145's configuration file 140 is set such that an automatic issuance of security context token property is enabled, the Web service application 145 gives the request 130 to a Web service engine 160. The Web service engine 160 can initiate token issuer 165 and pass the request to an instance of a class that uses the base token for generating the security context token 135. Web service engine 160 may then store a copy of the security context token 135 on behalf of the Web service application 145 for subsequent use reference (e.g., referencing the base token information) for communications with the client application 115 during the session. For the duration of the session, the security context token 135 may be used for any subsequent requests or other communications to the service application 145.

Security Context Token 135 may then be sent back to the client application 115 via the internet 125. The policy engine receives the SCT 135 and uses it to sign and/or encrypt message 150 to form SCT message 120, which is then sent to the Web service application 145 in a communication session. Further, SCT 135 can be cached within the client application 115 memory for use in all session communications with the Web service application 145 during the lifetime of security context or SCT if an age or other expiration limitation is imposed thereon.

The present invention further minimizes code needed in the Web service application 145 by making the use of the security context token 135 transparent to the Web service application 145. In other words, after initial authorization using the base token, the Web service engine 160 can fully issue, manage, and otherwise authenticate the client application 115 using the security context token 135 without any further assistance from the Web service application 145. More particularly, once the Web service application 145 has authorized the base token for the client 115, the Web service engine 160 can fully maintain and manage the base token information and the security context token 135 information. The Web service engine 160 may then use the security context token 135 in subsequent communications with the client application 115 to reference (either directly or indirectly) the base token, without any assistance or input from the Web service application 145.

Other example embodiments provide that upon expiration of the security context token 135, another request can be made on behalf of the client application 115 for a new security context token. As such, the policy engine 155 may recognize the expiration of the SCT 135 and make a request 130 in a similar manner as that described above.

Still other example embodiments allow for customizing context token issuer code for allowing service developers who need to customize the issuing logic, e.g., for authorization reasons. In particular, the developer of service application 145 may create a customized class for issuing tokens and register their customization with the system. In such instance, when issuing a security context token 135, the Web service engine 160 may utilize the custom context token issuer 165 for issuing the security context token 135.

In summary, the above example embodiments allow users through application configuration to specify that their service 145 will act as both the service 145 and a token issuer 165. Further, it allows clients 115 to automatically understand they should query the service 145 for the context in policy 110. By default, services 145 should not issue their context tokens 135 for security and processing reasons. A user, however, can easily enable this feature by turning the feature on with a simple switch in configuration 140. When this happens, all services within the application 145 will be capable of issuing context tokens 135.

The present invention may also be described in terms of methods comprising functional steps and/or non-functional acts. The following is a description of steps and/or acts that may be performed in practicing the present invention. Usually, functional steps describe the invention in terms of results that are accomplished, whereas non-functional acts describe more specific actions for achieving a particular result. Although the functional steps and non-functional acts may be described or claimed in any particular order, the present invention is not necessarily limited to any particular order or combination of acts and/or steps. Further, the use of acts and/or steps in the recitation of the claims and in the following description of the flowchart for FIGS. 2A and 2B are used to indicate the desired specific use of such terms.

Figure 2:
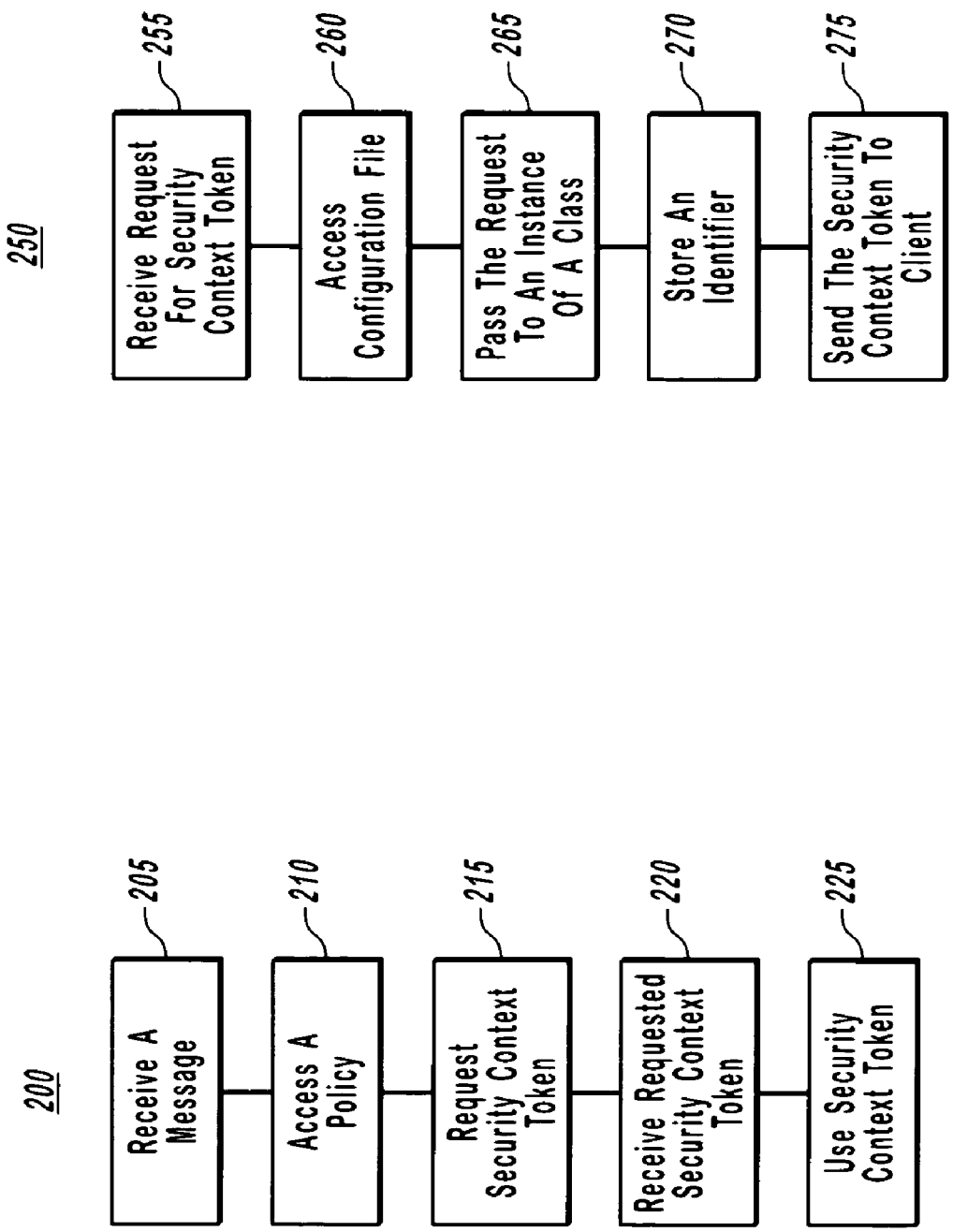
FIG. 2a illustrates a flowchart of a method of maintaining a secure conversation between two applications from a client side perspective in accordance with example embodiments.
FIG. 2b illustrates a flowchart of a method of maintaining a secure conversation between two applications from a service application perspective in accordance with example embodiments.

FIGS. 2A and 2B illustrate example flowcharts of various exemplary embodiments of the present invention. The following description of FIGS. 2A and 2B will occasionally refer to corresponding elements from FIG. 1. Although reference may be made to a specific element from these figures, such elements are used for illustrative purposes only and are not meant to limit or otherwise narrow the scope of the present invention unless otherwise explicitly claimed.

FIG. 2A illustrates an example flowchart of a method of maintaining a secure conversation between two applications using a security context token, without having to have executable code in either application for obtaining the security context token. Method 200 includes an act of receiving 205 a message. For example, policy engine 155 may receive from a client application 115 a message 150 that is to be sent to a service application 145 in a communication session as part of an established security context. Message 150 may be a SOAP message of any type of a request, reply, failure, etc.

Method 200 also includes an act of accessing 210 a policy. For example, policy engine 155 may access a policy 110 that corresponds to client application 115. The policy 110 may include a declarative policy assertion for determining that communication session messages 150 sent to the service application 145 should be communicated using a security context token 135 associated with a base token used in establishing the security context. Policy 110 may be in the form of eXtensible Markup Language (XML)-e.g., as defined in WS-Policy, WS-Security Policy, etc.- and may include other policies, expressions, assertions other than those corresponding to the security context token issuer. Alternatively, if the policy does not include an identifier for referencing a security context token, a default request is made to the service application 145.

Method 200 further includes an act of requesting 215 security context token. For example, based on information within the policy 110, the policy engine 155 can make a request 130 for the security context token. The request 130 can include information for identifying the base token (i.e., information identifying the token associated with the authentication process.) This identification can either be a direct or indirect reference, i.e., the request 130 may include the base token, or included other associated tokens. Further, the properties of the request 130 may be changed prior to sending the request in order to conform to additional policies within policy 110. For example, the request may need to be encrypted and/or signed in accordance with policies of the Web service application 145.

Method 200 also includes an act of receiving 220 the requested security context token. Further, method 200 includes the act of using 225 the security context token. For example, policy engine 155 for client application 115 may receive the requested security context token 130 and use it for securing the message prior to sending it to the service application. The base token being a user name token including one or more of a name, identity, key computing capabilities, an X.509, Kerberos, Security Assertion Markup Language (SAML), or other tokens. The securing of the message using the security context token may be one or more of a signing or encryption of at least a portion of the message. Other embodiments provide that the security context token may be a customer context token generated based on desired properties established in a custom security context token issuer set by a developer of the service application.

Other example embodiments provide for storing the security context token 135 for future communications and reference. For example, policy engine 155 may receive a secure message 120 from the service application 145. The received message 120 may be accessed for identifying that is associated with the service application 145. Further, the policy document 110 may be accessed to determine that an assertion requires the secure message 120 to be secured using the secured context token 135. Policy engine 155 may then verify that the secured message conforms to the assertion and process the secured message by using information within the base token that is referenced using the identifier in the security context token 135. Further, subsequent messages sent to the service application during the communication session are secured using the security context token.

Other example embodiments provide that if during the communication session the security context token expires, another security context token may automatically be requested and received from the service application without having to have executable code in the client application for making such a request.

FIG. 2B illustrates an example flowchart of a method of maintaining a secure conversation between two applications using a security context token, without having to have executable code in either application for generating the security context token. Method 250 includes an act of receiving 255 a request for a security context token. For example, application service 145 may receive (directly) a request 130 for an SCT. Alternatively, Web service engine 160 (or token issuer 165) may receive the request 130 if the policy 110 explicitly identifies the token issuer 165.

Regardless of wherein the request for the SCT 130 is received, the request 130 should include an identifier that identifies a base token used in establishing the security context for a communication session between a client application 115 and the service application 145. Base token may be a username token including one or more of a name, identity, key and computing capabilities. Further, the request may include an action identifier indicating that the request is for a request for a security context token 130.

Method 250 may also include an act of accessing 260 a configuration file. For example, Web service application 145 upon receiving the request may identify the message as a request for a security context token. As such, it will look up in its configuration file to see if an automatic issuance of security context token is enabled within the configuration file 140. If this property is enabled, method 250 includes an act of passing 265 the request to an instance of a class. For example Web service application 145 may give the request 130 to Web service engine 160, which then passes it to token issuer 165 that includes an instance of a class that uses the identifier (e.g., base token I.D.) within the request for generating the security context token 135. The security context token 135 may be a custom context token generated based on desired properties established in a custom security context token issuer 165 set by a developer of the service application.

Method 250 also includes an act of storing 270 an identifier. For instance, the Web service engine 160 (or service application 145) may store an identifier (e.g., a GUID (global unique identifier)), which is associated with the security context token 135 for referencing the base token. Security context token 135 may be used for future reference for indicating that security context token 135 corresponds to the base token. A message that is received from the client application 115 that is secured using the security context token 135, may be processed by using information within the base token that is referenced using the identifier in its security context token 135. Further, subsequent messages sent to the client application 115 during the communication session may be secured using the security context token 135. Securing of the message using the security context token may be one of a signing or encryption of at least a portion of the message.

Finally, method 250 includes an act of sending 275 the securing context token to the client. For example, Web service application 145 may send security context token 135 via the internet 125 to client 115 for use in applying to messages 120 of the communication session.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise computer-readable storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 3:
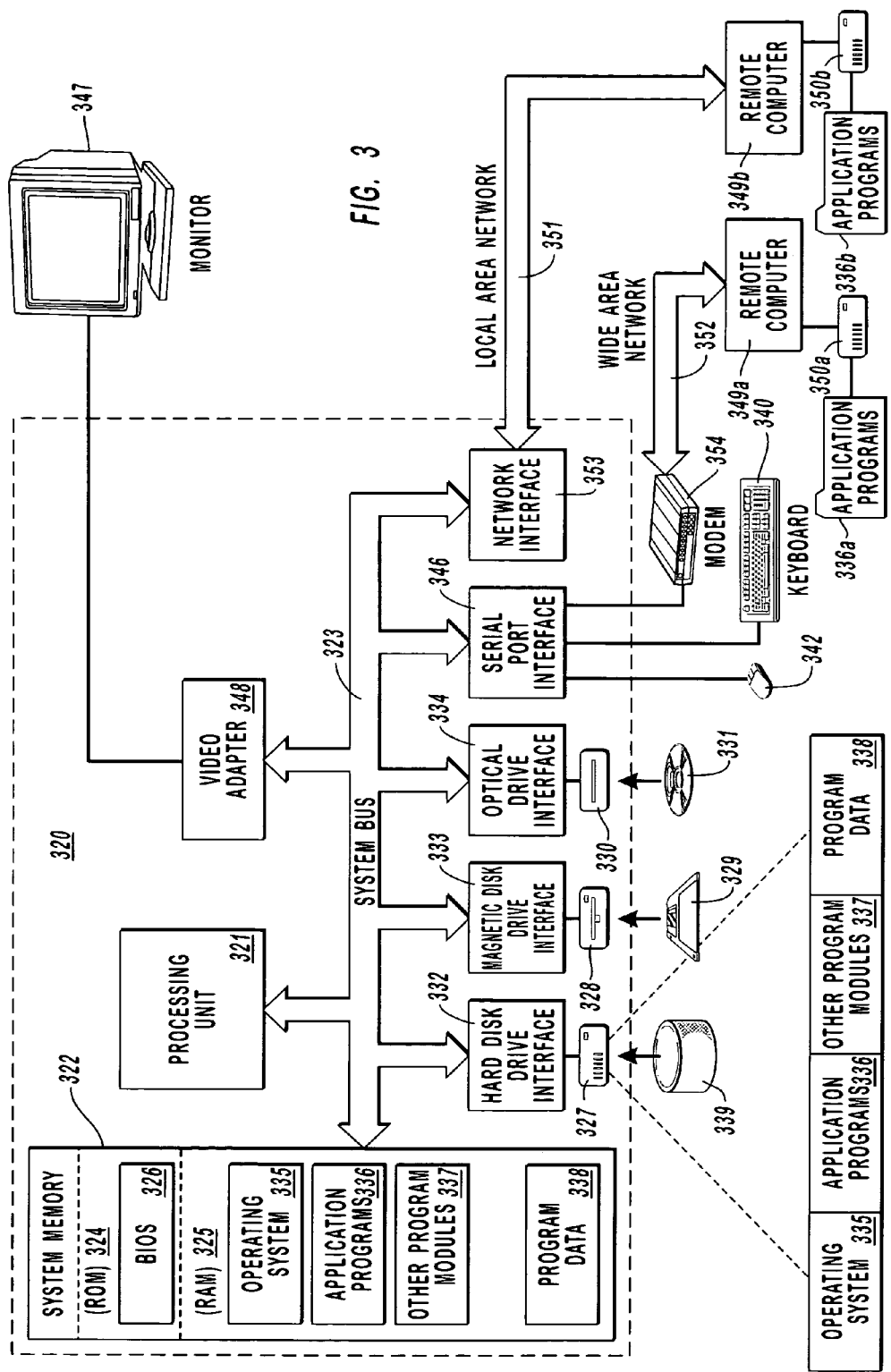
FIG. 3 illustrates an example system that provides a suitable operating environment for the present invention.

FIG. 3 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc., that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 3, an exemplary system for implementing the invention includes a general purpose computing device in the form of a conventional computer 320, including a processing unit 321, a system memory 322, and a system bus 323 that couples various system components including the system memory 322 to the processing unit 321. The system bus 323 may be any of several types of bus structures including a memory bus or memory controller, a peripheral bus, and a local bus using any of a variety of bus architectures. The system memory includes read only memory (ROM) 324 and random access memory (RAM) 325. A basic input/output system (BIOS) 326, containing the basic routines that help transfer information between elements within the computer 320, such as during start-up, may be stored in ROM 324.

The computer 320 may also include a magnetic hard disk drive 327 for reading from and writing to a magnetic hard disk 339, a magnetic disk drive 328 for reading from or writing to a removable magnetic disk 329, and an optical disk drive 330 for reading from or writing to removable optical disk 331 such as a CD-ROM or other optical media. The magnetic hard disk drive 327, magnetic disk drive 328, and optical disk drive 330 are connected to the system bus 323 by a hard disk drive interface 332, a magnetic disk drive-interface 333, and an optical drive interface 334, respectively. The drives and their associated computer-readable media provide nonvolatile storage of computer-executable instructions, data structures, program modules and other data for the computer 320. Although the exemplary environment described herein employs a magnetic hard disk 339, a removable magnetic disk 329 and a removable optical disk 331, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 339, magnetic disk 329, optical disk 331, ROM 324 or RAM 325, including an operating system 335, one or more application programs 336, other program modules 337, and program data 338. A user may enter commands and information into the computer 320 through keyboard 340, pointing device 342, or other input devices (not shown), such as a microphone, joy stick, game pad, satellite dish, scanner, or the like. These and other input devices are often connected to the processing unit 321 through a serial port interface 346 coupled to system bus 323. Alternatively, the input devices may be connected by other interfaces, such as a parallel port, a game port or a universal serial bus (USB). A monitor 347 or another display device is also connected to system bus 323 via an interface, such as video adapter 348. In addition to the monitor, personal computers typically include other peripheral output devices (not shown), such as speakers and printers.

The computer 320 may operate in a networked environment using logical connections to one or more remote computers, such as remote computers 349a and 349b. Remote computers 349a and 349b may each be another personal computer, a server, a router, a network PC, a peer device or other common network node, and typically include many or all of the elements described above relative to the computer 320, although only memory storage devices 350a and 350b and their associated application programs 336a and 336b have been illustrated in FIG. 3. The logical connections depicted in FIG. 3 include a local area network (LAN) 351 and a wide area network (WAN) 352 that are presented here by way of example and not limitation. Such networking environments are commonplace in office-wide or enterprise-wide computer networks, intranets and the Internet.

When used in a LAN networking environment, the computer 320 is connected to the local network 351 through a network interface or adapter 353. When used in a WAN networking environment, the computer 320 may include a modem 354, a wireless link, or other means for establishing communications over the wide area network 352, such as the Internet. The modem 354, which may be internal or external, is connected to the system bus 323 via the serial port interface 346. In a networked environment, program modules depicted relative to the computer 320, or portions thereof, may be stored in the remote memory storage device. It will be appreciated that the network connections shown are exemplary and other means of establishing communications over wide area network 352 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a distributed system configured to exchange messages between computing systems, wherein a security context between two applications on different computing systems has been established utilizing a base token, a method of maintaining a secure conversation between the two applications using a security context token, without having executable code in either application for obtaining the security context token, the method comprising:

a step for authenticating a security context between a client application and a service application to establish a communication session;

an act of intercepting a message from a client application located at a first computing system, wherein the message is intended for a service application located at a second computing system, the first and second computing systems in a communication session as part of a previously established security context represented by the base token and wherein the message is intercepted by a policy engine distinct from the client application and the service application;

an act of the policy engine accessing a policy corresponding to the client application, the policy including a declarative policy assertion indicating that communication session messages sent from the client application to the service application should be communicated using a security context token associated with the base token originally used in establishing the communication session security context;

an act of the policy engine requesting the security context token from the service application based on information within the policy, the request including information for identifying the base token used in establishing the communication session security context;

the policy engine receiving the requested security context token in response to the request, wherein the requested security token is generated at an application remotely located from the policy engine in response to the request; and the policy engine using the received security context token for securing the message received from the client application prior to sending it to the service application.

2. The method of claim 1, further comprises the acts of:
storing the security context token for future reference;
receiving a secure message from the service application;
accessing the received message for identifying that it is associated with the service application;
accessing a policy document for determining that an assertion requires the secure message to be secured using the security context token;
verifying that the secured message conforms to the assertion; and
processing the secure message by using information within the base token that is referenced using the identifier in the security context token.

3. The method of claim 1 wherein subsequent messages sent to the service application during the communication session are secured using the security context token.

4. The method of claim 1, wherein during the communication session the security context token expires, and wherein another security context token is automatically requested and received from the service application without having to have executable code in the client application for making such request.

5. The method of claim session 1, wherein the properties of the request are changed prior to sending to the service for conforming to one or more policy assertions identified in the policy.

6. The method of claim 1, wherein the securing of the message using the security context token is one or more of a signing or encryption of at least a portion of the message.

7. The method of claim 1, wherein the policy includes an identifier for referencing a security context token issuer.

8. The method of claim 1, wherein the policy does not include an identifier for referencing a security context token, and wherein by default a request is made to the service application.

9. The method of claim 1, wherein the security context token is a custom context token generated based on desired properties established in a custom security context token issuer set by a developer of the service application.

10. The method of claim 1, wherein the policy is an eXtensible Markup Language (XML) document of declarative assertions.

11. The method of claim 1, wherein the base token is one or more of a username token including one or more of name, identity, key, computing capabilities, an X.509, Kerberos, Security Assertion Markup Language (SAML), or other tokens.

12. In a distributed system configured to exchange messages between computing systems, wherein a security context between two applications on different computing systems has been established utilizing a base token, a method of maintaining a secure conversation between the two applications using a security context token, without having executable code in either application for generating the security context token, the method comprising acts of:

authenticating a security context between a service application and a client application to establish a communication session;

receiving a request for a security context token from a policy engine located remotely from the service application, the request being generated in response to the policy enginge intercepting a message originated by the client application and including an identifier that references the base token used in previously establishing the security context for the communication session between the client application located at the first computing system and the service application located at a second computing system;

based on information within the request, accessing a configuration file corresponding to the service application for determining that an automatic issuance property for a security context token is enabled;

passing the request to an instance of a class that uses the identifier within the request for generating the security context token;

storing an identifier associated with the security context token that references the base token used to previously establish the security context; and sending the security context token to the policy engine for use in applying to messages communicated as part of the previously established communication session.

13. The method of claim 12, wherein the information within the request includes an action identifier indicating that request is for a security context token.

14. The method of claim 12, wherein the request is received by the service application.

15. The method of claim 12, further comprises the acts of:

storing the security context token for future reference and identifying that the security context token corresponds to the base token;

receiving a message from the client application that is secured using the security context token; and processing the secure message by using information within the base token that is referenced using the identifier in the security context token.

16. The method of claim 12, wherein subsequent messages sent to the client application during the communication session are secured using the security context token.

17. The method of claim 16, wherein the securing of the message using the security context token is one or more of a signing or encryption of at least a portion of the message.

18. The method of claim 12, wherein the security context token is a custom context token generated based on desired properties established in a custom security context token issuer set by a developer of the service application.

19. The method of claim 12, wherein the base token is one or more of a username token including one or more of name, identity, key, computing capabilities, an X.509, Kerberos, Security Assertion Markup Language (SAML), or other tokens.

20. In a distributed system configured to exchange messages between computing systems, wherein a security context between two applications on different computing systems has been established utilizing a base token, a computer program product for implementing a method of maintaining a secure conversation between the two applications using a security context token, without having executable code in either application for obtaining the security context token, the computer program product comprising one or more computer readable storage media having stored thereon computer executable instructions that, when executed by a processor, cause the distributed computing system to perform the following:

authenticate a security context between a client application and a service application to establish a communication session;

intercepting a message from a client application located at a first computing system, wherein the message is intended for a service application located at a second computing system, the first and second computing system in a communication session as part of a previously established security context represented by the base token and wherein the message is intercepted by a policy engine distinct from the client application and the service application;

access a policy corresponding to the client application, the policy including a declarative policy assertion indicating that communication session messages sent from the client application to the service application should be communicated using a security context token associated with the base token originally used in establishing the communication security context;

based on information within the policy, request the security context token from the service application, the request including information for identifying the base token used in establishing the communication session security context;

receive the requested security context token in response to the request, wherein the requested security token is generated at an web application remotely located from the policy engine in response to the request; and use the received security context token for securing the message received from the client application prior to sending it to the service application.

21. The computer program product of claim 20, further comprising computer executable instructions that can cause the distributed computing system to perform the following:

store the security context token for future reference;

receive a secure message from the service application;

access the received message for identifying that it is associated with the service application;

access a policy document for determining that an assertion requires the secure message to be secured using the security context token;

verify that the secured message conforms to the assertion; and process the secure message by using information within the base token that is referenced using the identifier in the security context token.

22. The computer program product of claim 20, wherein subsequent messages sent to the service application during the communication session are secured using the security context token.

23. The computer program product of claim 20, wherein during the communication session the security context token expires, and wherein another security context token is automatically requested and received from the service application without having to have executable code in the client application for making such request.

24. The computer program product of claim session 20, wherein the properties of the request are changed prior to sending to the service for conforming to one or more policy assertions identified in the policy.

25. The computer program product of claim 20, wherein the securing of the message using the security context token is one or more of a signing or encryption of at least a portion of the message.

26. The computer program product of claim 20, wherein the policy includes an identifier for referencing a security context token issuer.

27. The computer program product of claim 20, wherein the policy does not include an identifier for referencing a security context token, and wherein by default a request is made to the service application.

28. The computer program product method of claim 20, wherein the security context token is a custom context token generated based on desired properties established in a custom security context token issuer set by a developer of the service application.

29. The computer program product of claim 20, wherein the policy is an eXtensible Markup Language (XML) document of declarative assertions.

30. The computer program product of claim 20, wherein the base token is one or more of a username token including one or more of name, identity, key, computing capabilities, an X.509, Kerberos, Security Assertion Markup Language (SAML), or other tokens.

31. In a distributed system configured to exchange messages between network connected computing systems, the network connected computing system being connected by an unsecure network, wherein a security context between two applications on different computing systems has been previously established using a base token, a computer program product for implementing a method of maintaining a secure conversation between the two applications using a security context token, without having executable code in either application for generating the security context token, the computer program product comprising one or more computer readable media having stored thereon computer executable instructions that, when executed by a processor, can cause the distributed computing system to perform the following:

authenticate a security context between a service application and a client application to establish a communication session;

receive a request at the service application over the unsecure network for a security context token from an application other than the client application at the first computing system, the application other than the client application being located at the first computing system, the request being generated by the application other than the client application in response to the application other than the client application intercepting a message originated by the client application directed to the service application and including an identifier that references the base token used in previously establishing security context for the communication session between the client application located at the first computing system and the service application located at a second computing system;

based on information within the request, including an action identifier indicating that the request is for a security context token, access a configuration file corresponding to the service application for determining that an automatic issuance property for a security context token is enabled;

pass the request to an instance of a class that uses the identifier within the request for generating the security context token;

store an identifier associated with the security context token that references the base token used to previously establish the security context; and send the security context token over the unsecure network to the application other than the client application for use in applying to messages communicated as part of the previously established communication session.

32. The computer program product of claim 31, further comprising computer executable instructions that can cause the distributed computing system to perform the following:

store the security context token for future reference and identifying that the security context token corresponds to the base token;

receive a message from the client application that is secured using the security context token; and process the secure message by using information within the base token that is referenced using the identifier in the security context token.

33. The computer program product of claim 31, wherein subsequent messages sent to the client application during the communication session are secured using the security context token.

34. The computer program product of claim 33, wherein the securing of the message using the security context token is one or more of a signing or encryption of at least a portion of the message.

35. The computer program product of claim 31, wherein the security context token is a custom context token generated based on desired properties established in a custom security context token issuer set by a developer of the service application.

36. The computer program product of claim 31, wherein the base token is one or more of a username token including one or more of name, identity, key, computing capabilities, an X.509, Kerberos, Security Assertion Markup Language (SAML), or other tokens.

* * * * *